UNITED STATES PATENT OFFICE.

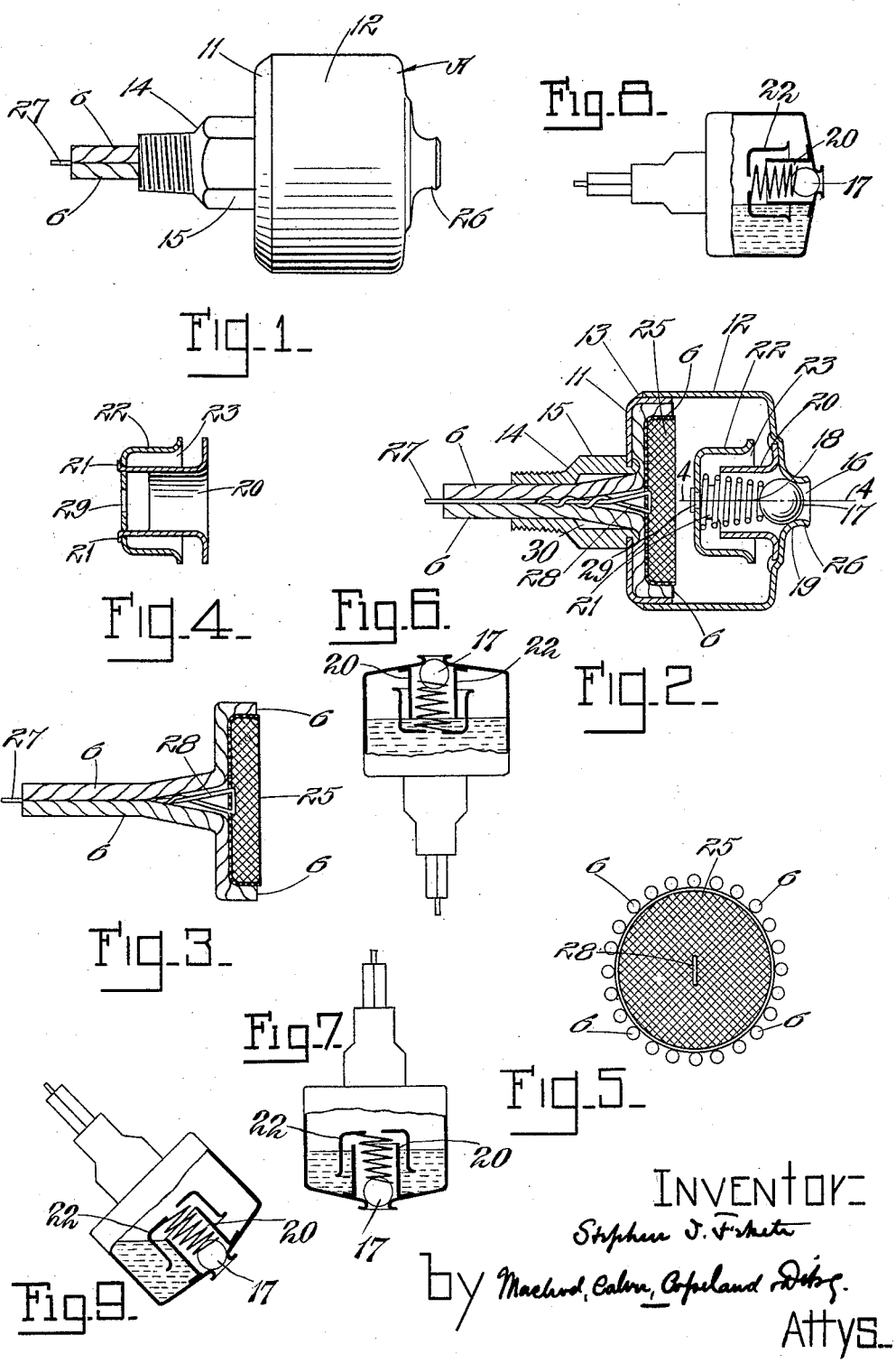

STEPHEN I. FEKETE, OF DETROIT, MICHIGAN, ASSIGNOR TO ESSEX MOTORS, OF DETROIT, MICHIGAN, A CORPORATION OF MICHIGAN.

OIL-CUP.

1,391,466.      Specification of Letters Patent.     Patented Sept. 20, 1921.

Application filed January 20, 1920. Serial No. 352,809.

*To all whom it may concern:*

Be it known that I, STEPHEN I. FEKETE, a subject of the King of Hungary, residing at Detroit, county of Wayne, State of Michigan, have invented a certain new and useful Improvement in Oil-Cups, of which the following is a specification, reference being had therein to the accompanying drawings.

My invention has for its object a new and improved oil cup to be used particularly on motor vehicles for lubricating moving parts, such for instance, as spring shackle bolts and the like. Great difficulty has been experienced in the past with lubrication of such parts, because the operators of vehicles find the work of refilling the lubricating devices dirty and inconvenient, and therefore, neglect it. The work of refilling a grease cup is particularly inconvenient and likely to be neglected. Furthermore, the caps of grease cups are frequently lost owing to the vibration of the vehicle which causes them to unscrew. A serious objection to oil cups as distinguished from grease cups is that grit works into the oil cup and is carried by the oil into the bearing, thus causing the bearing to wear which is the very thing which the lubricant is intended to prevent. Furthermore, the oil is shaken out and lost when traveling rough roads.

One object of my invention is to provide an oil cup of large capacity so that it will require filling only once or twice during the season, that will retain the oil put into it and will furnish to the wearing parts oil which is entirely free from dust or grit.

The oil cup embodying my invention is intended particularly for use in either a vertical or horizontal position without change of construction. This is a great advantage, as ordinary oil cups do not work as well on horizontal bolts as on vertical ones.

The invention will be fully understood from the following description when taken in connection with the accompanying drawings, and the novel features thereof will be pointed out and clearly defined in the claims at the close of this specification.

In the drawings, Figure 1 is a side elevation of an oil cup embodying my invention, the same being shown in the position which it occupies when applied to a horizontal bolt, such for instance as a spring shackle bolt.

Fig. 2 is a longitudinal section of the oil cup shown in Fig. 1.

Fig. 3 is a detail of the screen and wick.

Fig. 4 is a section of the oil tube and baffle taken on line 4—4 in Fig. 2.

Fig. 5 is an end view of the screen and wick shown in Fig. 3.

Figs. 6, 7, 8 and 9 show the position of the oil in the cup when the cup is in the several positions shown.

Referring now to the drawings, at A is shown the casing preferably made in two parts 11 and 12 soldered together as shown at 13. The part 11 is secured to a screw-threaded shank 14, which engages the bolt to be lubricated, the shank 14 having a wrench-receiving portion 15. The other part 12 of the casing is provided with an oil inlet hole 16 closed by some suitable closure, as for instance, a ball 17 held in contact with the edges of the hole by a spring 18. When this form of closure is employed, the edge of the casing surrounding the hole 16 is cupped, as shown at 19, to form a seat for the ball 17, and may be flared on the outside as shown at 26. This flaring renders it easier for the operator to find the oil inlet hole with the spout of the oil can when the cup is placed in an inconvenient position as is sometimes necessary. Any other well-known type of closure for the hole may be employed.

Surrounding the hole 16 and extending inwardly therethrough is an oil introduction tube 20. This oil introduction tube is provided with a pair of ears 21 which support a baffle or trap 22 which is a dish-shaped member. This baffle is of a diameter larger that the greatest diameter of the oil introduction tube 20 and is located between the inner end of the oil introduction tube and the outlet hole with its open end 23 to the right of the inner end of the oil introduction tube when the parts are in the position shown in Fig. 2. In other words the baffle 22 overlaps the oil introduction tube 20, and being of greater diameter than said tube its side wall is spaced apart from said tube so that said baffle loosely encircles said tube, so as to leave a passage for oil. The baffle 22 helps to keep the oil from splashing out and also serves as a support for the spring 18. It is provided with an air hole 29 to enable the cup to be filled in a vertical position. At 25 is a dish-shaped screen for locating and holding the strands 6 of wicking, twisted together and around a wire 27 by means of which the wicking can be conveniently inserted in the central hole in the bolt which is to be lubricated by the use of the oil cup. This wire 27 is conveniently secured to the bottom of the screen 25 by a loop 28 of the wire 27, so that the screen, wicking and wire can be made up as a single assembly for insertion in the casing before the joint 13 in the casing is soldered. The strands 6 of the wicking extend radially from the oil outlet in the casing part 11, as will be understood from Figs. 2, 3 and 5.

The casing is made of relatively large diameter so that it will contain as much oil as possible, and there is a free space for oil between the baffle and the screen. When in vertical position with the oil opening upward the oil cup can be filled up to the bottom of the oil introduction tube 20; when in horizontal position, as shown in Figs. 1 and 2, it can be filled up to the lower edge of the hole 16. The tube 20 extends into the center of the oil cup so that the cup will still be half full with the filler pointed downward. Thus it can be seen that the cup can always be at least half filled. The tube 20 and baffle 22 prevent oil once in from being shaken out even should the ball 17 be off its seat. As the wicking operates by capillary attraction, all danger of sediment reaching the moving parts is completely eliminated while the screen holds the wicks in place and at the same time allows the oil to reach them.

It will be noted that the wicking closely fills the oil outlet afforded by the tube or shank 14, and thus acts as a filter for the oil to prevent sediment or grit from passing to the bearing to be lubricated.

The oil introduction tube 20 surrounding the oil inlet hole is a very important feature of my invention. I find in actual practice that the oil cup embodying my invention is practically oil tight in any position even though the baffle 22 and the valve 17 are omitted. If the oil cup is placed in vertical position with the oil inlet hole at the top as shown in Fig. 6, the oil introduction tube 20 prevents splashing resulting from either horizontal or vertical movements of the vehicle to which it is attached. If the oil cup is placed in a vertical position with the oil hole down as shown in Fig. 7, the cup can be filled nearly to the top of the tube and no oil will escape. When the oil cup is placed in horizontal position as shown in Fig. 8, the oil introduction tube prevents the escape of oil due to the formation of a wave caused by horizontal movements of the vehicle. When placed in inclined position (see Fig. 9) the oil introduction tube prevents loss of oil from splashing as shown. The valve 17 serves chiefly to prevent the entrance of grit or dust into the oil cup rather than to retain the oil in the cup.

The radial arrangement of the wicks which extend radially about the hole 30 in the stem 14 makes it certain that at least one of the wicks will dip in the oil in the bottom of the oil cup when the oil cup is placed in horizontal position regardless of the position axially which the oil cup assumes. This is an important feature because it makes it possible to screw the stem 14 tightly into the shackle bolt or other part to be lubricated and no attention need be paid to the position which the oil cup assumes when the parts are tight. In this respect, the oil cup is a great improvement over the oil cups of the type which must be placed in some predetermined position.

What I claim is:—

1. An improved oil cup including a casing in which is an oil inlet hole, and an imperforate oil introduction tube mounted within said casing and surrounding said inlet hole, with an oil-tight joint between the outer end of said tube and the inner wall of the oil cup casing, said tube extending inwardly into the chamber of the casing and being open at its inner end.

2. An oil cup having an oil inlet hole, and an oil introduction tube surrounding said oil inlet hole and opening into the casing of the oil cup only at its inner end, said tube extending inwardly into the interior of the casing sufficiently to prevent escape of oil by splashing and serving to retain the oil in the cup regardless of the position in which the cup is installed.

3. In an oil cup, a casing having a centrally disposed oil outlet, an oil inlet, an oil introduction tube surrounding said oil inlet and extending into the chamber of said casing and serving to retain the oil in the cup regardless of the position in which the cup is installed, and wicking extending through said outlet, said wicking being distributed radially about said outlet.

4. In an oil cup, a casing having a centrally disposed oil outlet, an oil inlet, an oil introduction tube surrounding said oil inlet and extending into the chamber of said casing and serving to retain the oil in the cup regardless of the position in which the cup is installed, wicking extending through said outlet and disposed radially about the same, and means for holding the radially-disposed wicking in place.

5. In an oil cup, a casing having a tubular outlet portion for connection with the part to be oiled, an inwardly extending oil introduction tube having an open inner end and a baffle between the inner end of the said oil introduction tube and the oil outlet of the casing.

6. In an oil cup, a cylindrical casing having ends closed except for centrally disposed inlet and outlet openings in opposite ends, an inwardly extending oil introduction tube surrounding the inlet, and a baffle having a diameter greater than the inner end of the oil introduction tube located between the tube and the outlet.

7. In an oil cup, a cylindrical casing having closed ends except for opposite and centrally disposed inlet and outlet openings in opposite ends, an inwardly extending oil introduction tube surrounding the inlet, and a baffle having a diameter greater than the inner end of the oil introduction tube located between the tube and the outlet, said tube having prongs thereon by which the baffle is supported.

8. In an oil cup, a casing having an outlet portion for connection with the part to be oiled, an inwardly extending oil introduction tube having an open inner end, and wicking extending into the oil outlet of the casing.

9. In an oil cup, a casing having closed ends except for opposite and centrally disposed inlet and outlet openings in opposite ends, a dish-shaped screen, wicking between the screen and the casing and a wire secured to the screen and passing in to the oil passage of the part to be lubricated.

10. In an oil cup, a casing having an outlet portion for connection with the part to be oiled, an inwardly extending oil introduction tube, a baffle overlapping the inner end of said introduction tube and loosely surrounding the same, and wicking extending from said casing into the oil outlet.

11. In an oil cup, a casing, an inwardly extending oil introduction tube having an open inner end, a baffle loosely overlapping the inner end of the said introduction tube, and radially disposed wicking between the baffle and the casing.

12. In an oil cup, a casing having a tubular outlet portion for connection with the part to be oiled, an inwardly extending oil introduction tube having an open end, a baffle between the inner end of the oil tube and the oil outlet, a wick retainer and wicking, said wicking extending through the said outlet.

In testimony whereof I affix my signature.
STEPHEN I. FEKETE.